United States Patent
Holowczak et al.

(10) Patent No.: US 6,447,254 B1
(45) Date of Patent: Sep. 10, 2002

(54) LOW DIELETRIC CONSTANT EROSION RESISTANT MATERIAL

(75) Inventors: John E. Holowczak, South Windsor; Elliot Olster, Hamden; Willard H. Sutton, Glastonbury, all of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/861,125

(22) Filed: May 18, 2001

(51) Int. Cl.[7] ............................. B64C 11/24; F01D 5/28
(52) U.S. Cl. ..................... 416/224; 416/226; 416/230; 416/241 B
(58) Field of Search ................. 428/570, 629, 428/632; 423/325, 385, 412; 415/200; 416/241 B, 228, 224, 226, 229 R, 229 A, 230; 29/889.7

(56) References Cited

U.S. PATENT DOCUMENTS

| | | | | |
|---|---|---|---|---|
| 4,126,653 A | * | 11/1978 | Smith et al. | 29/889.7 |
| 4,351,787 A | * | 9/1982 | Martinengo et al. | 264/647 |
| 4,385,866 A | * | 5/1983 | Ochiai et al. | 416/185 |
| 4,597,926 A | * | 7/1986 | Ando et al. | 416/241 B |
| 4,654,315 A | * | 3/1987 | Hsieh | 501/152 |
| 4,713,302 A | * | 12/1987 | Komatsu | 428/698 |
| 4,975,394 A | * | 12/1990 | Kanzaki et al. | 423/325 |

* cited by examiner

Primary Examiner—Edward K. Look
Assistant Examiner—Igor Kershteyn
(74) Attorney, Agent, or Firm—Carlson Gaskey & Olds

(57) ABSTRACT

An erosion resistant ceramic component is synthesized from a silicon oxynitride precursor powder with a sintering aide. The sintering aide, preferably aluminum oxide and/or lutetium oxide are added to the silicon oxynitride precursor powder and ball milled. The composition is then decanted, dried and granulated. The composition is then formed into the shape of the desired component by hot pressing in a graphite die. A heat treatment process may also be applied after hot pressing to further improve erosion resistance by crystallizing amorphous grain boundary phases to provide a ceramic component having sand erosion characteristics superior to electro-formed nickel. The component provides a dielectric constant which is much lower than the dielectric constant of an electro-formed nickel component. The erosion resistant ceramic components are particularly applicable to leading edge components of main rotor blades, however, erosion protection of tail rotor blades, engine propellers, turbine blades, and other such components where high levels of erosion protection, and a low dielectric constant are desired will also benefit.

31 Claims, 1 Drawing Sheet

LOW DIELETRIC CONSTANT EROSION RESISTANT MATERIAL

BACKGROUND OF THE INVENTION

The present invention relates to an erosion protection material, and more particularly, to a low dielectric constant erosion resistant component for the leading edge of a rotor blade.

Rotor blade assemblies, and in particular the rotor blades thereof, must accommodate various dynamic loads such as bending loads, both flapwise (out-of-plane) and chordwise (in-plane), axial loads (centrifugal), and torsional loads (pitch). Such dynamic loads subject the rotor blade to varying degrees of stresses and strains.

In addition to the operational loads, the rotor blades are also subjected to a wide variety of environmental conditions. Experience has shown that rain and/or sand particles that impinge upon the leading edges of rotating rotor blades may have an adverse effect thereon by causing erosion wear of the leading edges. Erosion wear is of particular concern at the outboard end of the rotor blades due the higher rotational velocities thereof (the rotational speed at a given span point of the rotor blade is directly proportional to the radial distance from the rotor hub) wherein the relative impact velocities of rain and/or sand particles are significantly higher.

Several different techniques have been explored to increase the erosion resistance of rotor blade leading edges. One known technique is the incorporation of ductile metal leading edge cap or abrasion strip as an integral part of the rotor blade. To further reduce erosion of the leading edge caps, it is also known to apply a sacrificial material over the leading edge caps. Typically, the sacrificial material is an elastomeric material that may be applied as a tape. Another known technique is the incorporation of a ceramic leading edge cap as an integral part of the rotor blade.

These known leading edge cap techniques accommodate the dynamic stress environment of a rotor blade during operation while providing wear resistance protection against the wide variety of environmental conditions encountered during flight operations. However, each of these known techniques includes components which may have a relatively high Radar Cross Section (RCS) and may be a primary cause of radar reflections. Even known highly erosion resistant ceramic materials based on silicon nitride and yttrium SiAlON, have dielectric constants (DK) of 7.9 or higher. A high RCS may be undesirable in many environments.

Those skilled in the art of passive RCS reduction will recognize that it would be highly preferable to have rotor blade leading edge components with lower dielectric constants while providing the erosion benefits that ceramics have over metals such as nickel or titanium. Accordingly, it is desirable to provide enhanced erosion wear protection components which accommodate the high stress environment of a rotor blade, while providing a low dielectric constant.

SUMMARY OF THE INVENTION

Erosion resistant ceramic components according to the instant invention are preferably synthesized from a silicon oxynitride precursor powder with a sintering aide. The sintering aide, preferably aluminum oxide and/or lutetium oxide are added to the silicon oxynitride precursor powder and ball milled in distilled, deionized water or other solvents. The composition is then decanted and dried to evaporate volatiles. Once dried, the material is granulated such as by passage through a 20-mesh screen.

After granulation, the material is formed into the shape of the desired component by hot pressing in a graphite die. Preferably, a low pressure on the order of 3.5 Mpa is applied to the die during hot pressing during heat up to approximately 1400° C. followed by a ramp to the final pressing pressure to improve die longevity.

A heat treatment process may also be applied after hot pressing to further increase erosion resistance. The previously hot pressed component is placed inside a boron nitride enclosure and heat-treated for 2 to 24 hours under one atmosphere of nitrogen at 1500° C.

The heat treating crystallizes amorphous grain boundary phases which result in a material having sand erosion characteristics superior to an electro-formed nickel component commonly used for rotor blade erosion strips. The erosion resistant ceramic component further exhibits a dielectric constant which is much lower than electro-formed nickel component.

The erosion resistant ceramic components according to the instant invention are particularly applicable to main rotor blades. In addition, leading edge erosion protection of tail rotor blades, engine propellers, turbine blades, various turbomachinery components and other components where high levels of erosion protection, and a low dielectric constant are desired will also benefit from the instant invention.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
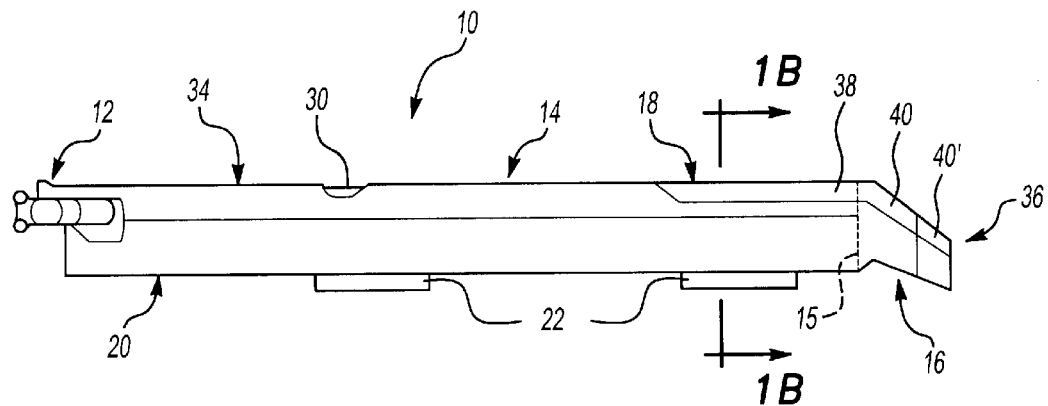
FIG. 1A is a top plan view of an exemplary main rotor blade assembly.

FIG. 1A schematically illustrates an exemplary main rotor blade 10 which includes an inboard segment 12 configured for mounting the main rotor blade 10 to a rotor hub assembly (not shown), an intermediate segment 14, and a replaceable tip segment 16 (reference numeral 15 identifies the demarcation between the outboard end of the intermediate segment 14 and the replaceable tip segment 16). The inboard, intermediate, and tip segments 12, 14, 16 define the span of the main rotor blade 10. The main rotor blade 10 has a leading edge 18 and a trailing edge 20, which define the chord of the main rotor blade 10.

An adjustable trim tab 22 extends rearwardly from the trailing edge 20. Upper and lower skins 24, 26 define the upper and lower aerodynamic surfaces of the main rotor blade 10. The skins 24, 26 are preferably formed from several plies of prepreg composite material such as woven fiberglass material embedded in a suitable resin matrix.

Figure 1B:
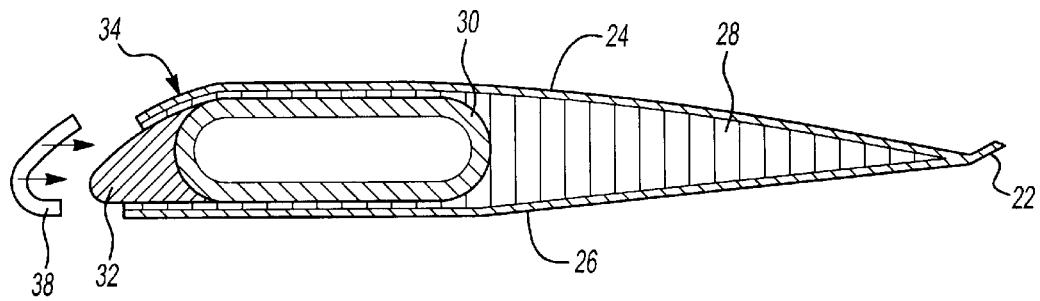
FIG. 1B is a cross-sectional view of the main rotor blade of FIG. 1 taken along line 1B—1B thereof.

Referring also to FIG. 1B, a honeycomb core 28, a spar 30, one or more counterweights 32, and a leading edge sheath 34 form the interior support for the skins 24,26 of the main rotor blade 10. The spar 30 functions as the primary structural member of the main rotor blade 10, reacting the torsional, bending, shear, and centrifugal dynamic loads developed in the rotor blade 10 during operation. The spar 30 is preferably manufactured of a composite of unidirectional laminates comprised of high and low modulus fibers and cross ply laminates comprised of high modulus fibers. It will be appreciated that the rotor blades may be fabricated of other materials, e.g., a titanium spar.

An outermost tip segment 36 (FIG. 1A) of the main rotor blade 10 defines an aerodynamic contour, which produces an increase in lift distribution over the span of the main rotor blade 10. The outermost tip segment 36 is preferably separately removable from replaceable tip segment 16 in a known manner to further facilitate repair or replacement thereof.

The leading edge sheath 34 is a hybrid component fabricated from composite materials and abrasion-resistive materials, according to the instant invention. The sheath 34 has a generally C-shaped configuration that defines the leading edge 18 of the main rotor blade assembly 10. The sheath 34 preferably includes at least one abrasion strip 38 manufactured of a low dielectric constant erosion resistant ceramic material further described herein. Tip segment 16 also includes an abrasion strip similar to abrasion strip 38. Further, the tip segment 36 includes a contoured abrasion strip 40' which defines a contoured leading edge of the outermost tip segment 36 and end of the rotor blade 10. It should be realized that the tip segment abrasion strip 40 is not to be limited to a substantially linear component and can also define an end tip segment 40 ' or the rotor blade assembly 10.

The abrasion strips 38, 40, 40' (FIG. 1A), are preferably located along the outboard one-quarter to one-third portion of the main rotor blade 10 as the outboard section experiences the bulk of abrasion effects. The abrasion strips 38, 40, 40' provide excellent wear resistance against water droplet, e.g., rain, impacts and erosion as a result of particulate impacts, e.g., sand over a prolonged time period. Further, because the abrasion strips 38, 40, 40' are defined along the outboard leading edge portion of the main rotor blade 10, the abrasion strips may advantageously influence RCS. Mounting of an engineered ceramic component to a rotor blade leading edge is described in more detail in U.S. Pat. No. 5,542,820 entitled ENGINEERED CERAMIC COMPONENTS FOR THE LEADING EDGE OF A HELICOPTER ROTOR BLADE which is incorporated by reference in its entirety into this description.

Figure 2:
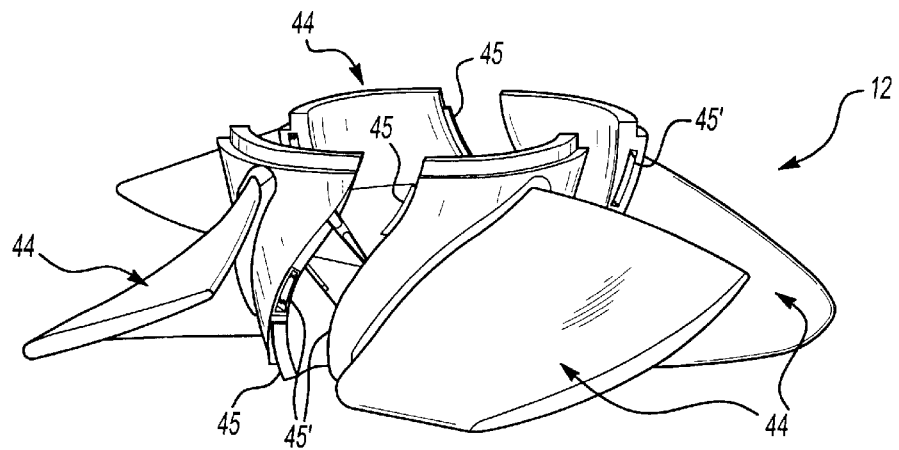
FIG. 2 is a perspective view of a turbomachinery component formed of the erosion resistant ceramic material according to the instant invention.

It should be realized that the erosion resistant ceramic material may not only be used as a leading edge member which is integrated into another component, but can also form a completely independent component such as a turbine assembly 42 (FIG. 2). The turbine assembly 42 is formed as a multiple of blade segments 44 each of which is assembled together to form the complete turbine assembly. Engagement members 45, 45' are preferably molded to each blade segment 44 to provide alignment assembly. It should be further realized, however, that entire assemblies may likewise be formed as a one-piece component.

Many embodiments of the aforedescribed low dielectric constant erosion resistant ceramic components will benefit applications where very high sand and rain erosion resistance, low dielectric constant and/or high temperature resistance are required. The low dielectric constant erosion resistant ceramic components according to the instant invention provide improved physical properties, i.e., are highly resistant to environmental affects such as silica sand. Further, the low dielectric constant erosion resistant ceramic components provide a low dielectric constant such that the outboard leading edge portion of the rotor blade assemblies provide minimal radar reflectivity.

The erosion resistant ceramic components are preferably synthesized from silicon nitride powder which is calcined in the presence of oxygen, preferably air, to add oxygen to the composition as is known in the art. Adding oxygen to the silicon nitride results in an amorphous silicon oxynitride forming on the surface of the silicon nitride grains. Because the oxygen and nitrogen must diffuse through the amorphous layer to continue the reaction, the resulting powder has a silicon nitride core surrounded by an amorphous silicon oxynitride layer. This powder is then sintered to full density using conventional sintering techniques and/or pressure densification.

Further reductions in nitrogen/oxygen diffusion distance may be obtained by using a silicon oxynitride precursor powder, and such a powder may be obtained from *UBE America* having offices at 55 East 59th Street 18 Floor, New York, N.Y. 10022, U.S.A. (referred to as $Si_2ON_2$ in UBE literature). The silicon oxynitride precursor powder includes an amorphous powder with approximately 20 wt % oxygen, 17 wt % nitrogen, and 63 wt % silicon, which is very close to stochiometric silicon oxynitride.

A sintering aide, preferably aluminum oxide and/or lutetium oxide are added to the silicon oxynitride precursor powder. Those skilled in the art will recognize that a variety of rare earth oxides, including, but not limited to, yttrium oxide, ytterbium oxide, lanthanum oxide, cerium oxide, neodymium oxide, gadolinium oxide, erbium oxide, and terbium oxide may be utilized in small amounts (to avoid raising K value) as a sintering aide.

Preferably, the sintering aide is added to the silicon oxynitride precursor powder at approximately 1 to 3 weight %. The silicon oxynitride precursor powder is ball milled with the desired sintering aide in distilled, deionized water that is pH adjusted to 10 using ammonium hydroxide or other aqueous solvents. It should be understood that isopropyl alcohol or other aqueous solvents may also be used in the ball milling process. Preferably the components are ball milled for 24 hours total milling time. The mixture is then decanted and dried to drive out volatiles (known commonly as outcasting). Once dried the material is granulated such as by passage through a 20-mesh screen.

After granulation the material is formed into the shape of the desired component. The powder is preferably charged into a graphite die and hot pressed as detailed in the chart below. Preferably, low pressure on the order of 3.5 Mpa is applied to the die during hot pressing during heat up to 1400° C. followed by a ramp to the final pressing pressure to improve die longevity. The erosion resistant ceramic components are preferably fabricated as integral, i.e., unitary, structures of the rotor blade such as the above described abrasion strips. The erosion resistant ceramic components, however, may also be fabricated as independent replaceable components such as an entire removable tip segments of the main rotor blades. The replaceable component thereby provides improved repair and maintenance capabilities.

TABLE 1

Trials Using High Surface Area, Amorphous Silicon Oxynitride Precursor

| Sample No. | Additive Amount | Additive | Hot Press (4KSI, N$_2$) | D (G/CC) | DK | Erosion Rate (CC/KG) |
|---|---|---|---|---|---|---|
| 10.1 | — | — | 1750° C./3 hr. | 2.394 | 4.75 | 6.056 |
| 10.2 | — | — | 1750° C./1 hr. | 2.616 | 5.75 | 1.089 |
| 10.3 | — | — | 1800° C./2 hr. | 2.724 | 5.88 | 2.159 |
| 10.4 | 2 wt. % | Lu$_2$O$_3$ | 1800° C./1 hr. | 2.463 | 5.93 | 4.803 |
| 10 5 | 2 wt. % | Al$_2$O$_3$ | 1800° C./1 hr. | 2.768 | 5.94 | 2.518 |
| 10 6 | 2 wt. %, 2 wt. % | Lu$_2$O$_3$ + Al$_2$O$_3$ | 1800° C./1 hr. | 2.820 | 5.87 | 0.773 |
| 10.6A | 2 wt. %, 2 wt. % | Lu$_2$O$_3$ + Al$_2$O$_3$ | 1650° C./2 hr. | 2.690 | 6.00 | 0.986 |
| 10.6AC | 2 wt. %, 2 wt. % | Lu$_2$O$_3$ + Al$_2$O$_3$ | 1650° C./2 hr. + heat treat 1550° C./5 hr. | ~2.7 | 5.90 | 0.138 |
| Nickel | (Control) | Production Ni | (electro-formed) | 8.90 | >50 | 0.21 |

For components without sintering aides (Sample numbers 10.1, 10.2, 10.3), it was determined that an increased hold time at elevated temperature results in disassociation and foaming. The low dielectric constant combined with low density indicates that nitrogen or other gases were trapped; this is borne out by the low erosion resistance indicated above. While trapped nitrogen and oxygen result in pores that decrease the apparent high frequency dielectric constant, the pores act as flaws, which decrease strength and erosion resistance.

The components with sintering aides (Sample numbers 10.4, 10.5, 10.6), provide an extremely effective combination of low dielectric constant and low erosion rate. Preferably, between 0.5 and 3 weight % of the sintering aide(s) are added to provide desirable erosion resistance with an acceptable dielectric constant.

Sample 10.6, which includes both aluminum oxide and lutetium oxide, has particularly desirable characteristics. Sample 10.6 has a dielectric constant of 5.87 at X-band frequencies (around 10 GHz), while providing a high resistance to sand erosion.

Sample 10.6 exhibits a mass erosion rate of 0.773 grams eroded, for each 1 kg of 20/30 mesh sand at 800 feet per second at a 90 degree incidence angle. The velocity in the erosion tests is similar to helicopter blade tip velocities.

In another embodiment, a magnesium aluminosilicate sintering aide is added to a silicon nitride as generally described above. Silicone nitride provides a DK value which is higher than silicon oxynitride based materials. However, silicon nitride/ magnesium aluminosilicate reduces manufacturing expenses while still providing a relatively low DK value.

TABLE 2

Trials Using High Surface Area, Amorphous Silicon Nitride Precursor

| Sample No. | MgO Amount | Al$_2$O$_3$ Amount | SiO$_2$ Amount | Si$_3$N$_4$ Amount | Erosion # impacts @ m/sec. (Rain) | DK @ 10 GHz | Erosion Rate (g/KG) (Sand) |
|---|---|---|---|---|---|---|---|
| LOLE-005 | 3 wt % | 7 wt % | 10 wt % | 80 wt % | 478 @ 220 NO EFFECT | 7.20 | 0.012 |
| LOLE-007 | 5 wt % | 10 wt % | 13 wt % | 72 wt % | 350 @ 220 NO EFFECT | 7.10 | 0.176 |
| LOLE-008 | 7 wt % | 13 wt % | 20 wt % | 60 wt % | 497 @ 220 NO EFFECT | 7.06 | 0.63 |
| LOLE-009 | 3 wt % | 5 wt % | 27.5 wt % | 64.5 wt % | No test | 6.3 | 1.33 (Eroded) |
| LOLE-010 | 3 wt % | 5 wt % | 18 wt % | 74 wt % | 1773 @ 224 NO EFFECT | 6.7 | 0.0182 |

Use of cordierite as an additive proved to be the most successful approach to date. Cordierite (magnesium aluminosilicate) ceramics have a dielectric constant of about 5 to 5.5, and this additive increases fracture toughness (while decreasing dielectric constant) at low levels of addition in other silicon nitride ceramics. LOLE-005, -007 and -008 reflect increasing cordierite addition. As additive levels increased, the dielectric constant decreased only slightly (from 7.2 for -005 to 7.06 for -008) while erosion resistance remained high.

It was further determined that a post hot pressing heat treatment provides an increased sand erosion resistance to the 10.6 component (Table 1). The previously hot pressed component is placed in a silicon nitride powder beds, inside a boron nitride enclosure and heat treated for 5 hours under one atmosphere of nitrogen at 1500° C. The heat treating crystallizes amorphous grain boundary phases to provide a component (Sample 10.6AC) having sand erosion characteristics superior to the electro-formed nickel control component which is commonly used for rotor blade erosion strips. Further, the 10.6AC component exhibits a dielectric constant which is an order of magnitude superior to the electro-formed nickel component which has dielectric constant of over 50.

A variety of modifications and variations of the instant invention are possible in light of the above teachings as many complex shapes may be formed from the low dielectric constant erosion resistant ceramic materials discussed above. For example only, embodiments of the erosion resistant ceramic components described hereinabove are utilized with a helicopter main rotor blade. One skilled in the art will appreciate that the erosion resistant ceramic components according to the instant invention also have utility for use with helicopter tail rotor blades, leading edge caps, abrasion strips, and rotor blade tip segments. The ceramic components according to the present invention also have utility for leading edge erosion protection of engine propellers, turbine blades, guides various turbomachinery components such as, but not limited to, fan blades, vanes, and compressor blades, turbine exit guides and other such components where high levels of erosion protection, and a low dielectric constant is desired.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An erosion resistant ceramic component comprising:
   a silicon oxynitride; and
   a sintering aide, said component having a dielectric constant less than 6.5 and a sand erosion rate of less than 5.0 c c/kg, where the sand erodent is a 20/30 mesh sand, the erodent incident angle is approximately 90 degrees, and the sand velocity is approximately 215 meters/second.

2. The component as recited in claim 1, wherein said silicon oxynitride includes approximately 20 weight % oxygen, 17 weight % nitrogen, and 63 weight % silicon.

3. The component as recited in claim 1, wherein said sintering aide includes between 0.5 and 3 weight % aluminum oxide.

4. The component as recited in claim 1, wherein said sintering aide includes approximately 2 weight % aluminum oxide.

5. The component as recited in claim 1, wherein said sintering aide includes between 0.5 and 3 weight % lutetium oxide.

6. The component as recited in claim 1, wherein said sintering aide includes approximately 2 weight % lutetium oxide.

7. The component as recited in claim 1, wherein said sintering aide includes between 0.5 and 3 weight % aluminum oxide and between 0.5 and 3 weight % lutetium oxide.

8. The component as recited in claim 1, wherein said sintering aide includes approximately 2 weight % aluminum oxide and approximately 2 weight % lutetium oxide.

9. The component as recited in claim 1, wherein said component has a sand erosion rate of less than 1.0 c cc/kg, where the sand erodent is a 20/30 mesh sand, the erodent incident angle is approximately 90 degrees, and the sand velocity is approximately 215 meters/second.

10. The component as recited in claim 1, wherein said component has a dielectric constant less 6.1 and a sand erosion rate of less than 1.0 c cc/kg, where the sand erodent is a 20/30 mesh sand, the erodent incident angle is approximately 90 degrees, and the sand velocity is approximately 215 meters/second.

11. An erosion resistant ceramic rotor blade component comprising:
    a silicon oxynitride; and
    a sintering aide including aluminum oxide and lutetium oxide, said component having a dielectric constant less than 6.5 and a sand erosion rate of less than 5.0 c cc/kg, where the sand erodent is a 20/30 mesh sand, the erodent incident angle is approximately 90 degrees, and the sand velocity is approximately 215 meters/second.

12. The rotor blade component as recited in claim 11, wherein said silicon oxynitride includes approximately 20 weight % oxygen, 17 weight % nitrogen, and 63 weight % silicon.

13. The rotor blade component as recited in claim 11, wherein said sintering aide includes approximately 2 weight % aluminum oxide and approximately 2 weight % lutetium oxide.

14. The rotor blade component as recited in claim 11, wherein said component has a dielectric constant less than 6.1 and a sand erosion rate of less than 1.0 c cc/kg, where the sand erodent is a 20/30 mesh sand, the erodent incident angle is approximately 90 degrees, and the sand velocity is approximately 215 meters/second.

15. The rotor blade component as recited in claim 11, wherein said component has a dielectric constant between 5.0 and 6.1 and a sand erosion rate between 0.1 cc/kg and 1.0 cc/kg, where the sand erodent is a 20/30 mesh sand, the erodent incident angle is approximately 90 degrees, and the sand velocity is approximately 215 meters/second.

16. The rotor blade component as recited in claim 11, wherein said rotor blade component includes a rotor blade leading edge.

17. The rotor blade component as recited in claim 11, wherein said rotor blade component includes an abrasion strip.

18. The rotor blade component as recited in claim 11, wherein said rotor blade component includes a removable tip segment.

19. The rotor blade component as recited in claim 11, wherein said rotor blade component includes a turbine blade.

20. A method of manufacturing a low dielectric constant erosion resistant ceramic rotor blade component comprising the steps of:
    (1) ball milling a silicon oxynitride with a sintering aide for a first period of time; and
    (2) hot pressing the silicon oxynitride and the sintering aide in a die to form the component.

21. A method as recited in claim 20, wherein said step (1) further includes ball milling the silicon oxynitride with the sintering aide in isopropyl alcohol.

22. A method as recited in claim 20, wherein said step (1) further includes ball milling the silicon oxynitride with the sintering aide in a deionized water that is pH adjusted to 10.

23. A method as recited in claim 20, wherein said step (2) further includes:

(2a) hot pressing the silicon oxynitride and the sintering aide at approximately 3.5 Mpa up to approximately 1400° C.; and (2b) ramping to a final pressing pressure.

24. A method as recited in claim 20, further including the step of:

(3) heat treating the component after said step (4) for a second period of time.

25. A method as recited in claim 24, wherein said step (3) includes heat treating the component under one atmosphere of nitrogen at approximately 1500 degrees Centigrade.

26. A method as recited in claim 24, wherein said second period of time in said step (3) is approximately five hours.

27. An erosion resistant ceramic component comprising:

a silicon nitride; and a sintering aide including magnesium aluminosilicate, said component having a dielectric constant less than 7.0 and a sand erosion rate of less than 5.0 c c/kg, where the sand erodent is a 20/30 mesh sand, the erodent incident angle is approximately 90 degrees, and the sand velocity is approximately 215 meters/second.

28. The component as recited in claim 27, wherein said sintering aide includes approximately 20 weight % magnesium aluminosilicate.

29. The component as recited in claim 27, wherein said ceramic component includes approximately 20 weight % magnesium aluminosilicate and 80 weight % silicon nitride.

30. The component as recited in claim 27, wherein said ceramic component includes approximately 20 weight % magnesium aluminosilicate, 8 weight % silica and 72 weight % silicon nitride.

31. The component as recited in claim 27, wherein said component is a rotor blade leading edge component.

* * * * *